US011306491B2

(12) United States Patent
Ballantyne et al.

(10) Patent No.: US 11,306,491 B2
(45) Date of Patent: Apr. 19, 2022

(54) GRABBER TOOL AND SYSTEM

(71) Applicants: Flent Ballantyne, McKinney, TX (US); Steven Ballantyne, McKinney, TX (US); Mark D. Bliss, McKinney, TX (US)

(72) Inventors: Flent Ballantyne, McKinney, TX (US); Steven Ballantyne, McKinney, TX (US); Mark D. Bliss, McKinney, TX (US)

(73) Assignee: Ballantyne Gear Inc., McKinney, TX (US)

( * ) Notice: Subject to any disclaimer, the term of this patent is extended or adjusted under 35 U.S.C. 154(b) by 0 days.

(21) Appl. No.: 16/419,445

(22) Filed: May 22, 2019

(65) Prior Publication Data

US 2020/0370313 A1 Nov. 26, 2020

(51) Int. Cl.
*E04G 5/04* (2006.01)
*F16B 2/18* (2006.01)
*F16M 13/02* (2006.01)
*F16B 1/00* (2006.01)
*A62B 35/00* (2006.01)
(Continued)

(52) U.S. Cl.
CPC .......... *E04G 5/041* (2013.01); *A62B 35/0068* (2013.01); *F16B 1/00* (2013.01); *F16B 2/185* (2013.01); *F16M 13/022* (2013.01); *A62C 35/68* (2013.01); *F16B 2001/0035* (2013.01); *F16L 3/10* (2013.01)

(58) Field of Classification Search
CPC ...... F16B 1/00; F16B 2/00; F16B 2/02; F16B 2/185; F16B 2001/0035; F16M 13/022; E04G 5/041; A62B 35/0068
See application file for complete search history.

(56) References Cited

U.S. PATENT DOCUMENTS 2,422,865 A * 6/1947 Tucker ...................... B66C 1/34
248/228.4
2,682,694 A * 7/1954 Kempkes ................ A47J 45/02
24/569
(Continued)

FOREIGN PATENT DOCUMENTS

DE 1852202 U 5/1962
DE 3445682 A1 6/1986
(Continued)

OTHER PUBLICATIONS

"Black Steel with Rubber Cam Mop and Broom Holder, 12 Pk," Model No. 36LH92, www.grainger.com/product/36LH92?gclid=Cj0KCQjwhdTqBRDNARIsABsOI99SH8SRo7wdZAT9hHv5CnWFONc8dfFa7HCa2isCnBHQ9003H6jztoaAqXCEALw_wcB&cm_mmc=PPC:+Google+PLA&ef_id=Cj0KCQjwhdTqBRDNARIsABsOI99SH8SRo7wdZAT9hHv5CnVVFONc8dfFa7HCa2isCnBHQ9003H6jz Aug. 15, 2019.
(Continued)

*Primary Examiner* — Tan Le
(74) *Attorney, Agent, or Firm* — Quarles & Brady LLP; Joel A. Austin; Yakov S. Sidorin (57) ABSTRACT

Devices for anchoring objects to structural elements such as rafter beams and other similar objects are disclosed. Such anchoring devices include coupling devices configured to grasp beams nondestructively and may include multiple coupling devices to enable supporting extended structures too large or heavy to be supported by a single anchoring point in areas where hanging or supporting objects might otherwise be difficult.

17 Claims, 8 Drawing Sheets

(51) Int. Cl.
*F16L 3/10* (2006.01)
*A62C 35/68* (2006.01)

(56) References Cited

U.S. PATENT DOCUMENTS

| | | | | |
|---|---|---|---|---|
| 3,336,068 | A | * | 8/1967 | Renfroe ................ B66C 1/64 |
| | | | | 294/101 |
| 3,734,241 | A | | 5/1973 | Hale |
| 3,924,539 | A | | 12/1975 | Wladis |
| 4,398,620 | A | | 8/1983 | Townsend |
| 4,399,893 | A | | 8/1983 | Switzer |
| 4,582,176 | A | | 4/1986 | Roberts |
| 4,795,141 | A | * | 1/1989 | Mulvaney ............. B25B 5/08 |
| | | | | 269/236 |
| 5,005,813 | A | * | 4/1991 | Lawrence ........... B25B 5/006 |
| | | | | 269/236 |
| 5,033,146 | A | | 7/1991 | Fogarty et al. |
| 5,036,949 | A | | 8/1991 | Crocker et al. |
| D321,796 | S | | 11/1991 | Forrand |
| 5,137,112 | A | | 8/1992 | Nichols |
| 5,361,558 | A | | 11/1994 | Thornton et al. |
| 5,427,209 | A | | 6/1995 | Tannehill et al. |
| 5,607,029 | A | | 3/1997 | Beckham |
| 5,730,246 | A | | 3/1998 | Beard |
| 5,848,783 | A | * | 12/1998 | Weissenborn ........ A63C 11/04 |
| | | | | 269/97 |
| 6,112,853 | A | | 9/2000 | Beard |
| 6,681,893 | B1 | | 1/2004 | Coulson |
| 6,817,066 | B1 | | 11/2004 | Williams et al. |
| 7,686,566 | B1 | | 3/2010 | Murphy |
| 7,926,132 | B2 | | 4/2011 | Jordan |
| 8,038,106 | B2 | * | 10/2011 | Magno, Jr ............. F16B 2/10 |
| | | | | 248/72 |
| 8,096,384 | B2 | | 1/2012 | Caylor et al. |
| 8,292,030 | B2 | | 10/2012 | Ballantyne |
| 8,567,571 | B1 | | 10/2013 | Neff et al. |
| D720,278 | S | | 12/2014 | Pinkail |
| 9,248,323 | B1 | | 2/2016 | Larsen |
| 9,308,403 | B2 | | 4/2016 | Strawder |
| 9,744,387 | B1 | | 8/2017 | Hung |
| 9,924,753 | B1 | * | 3/2018 | Soto ......................... F16B 2/18 |
| 10,071,268 | B2 | | 9/2018 | Gaines et al. |
| 2005/0189171 | A1 | | 9/2005 | Bos |
| 2006/0054399 | A1 | | 3/2006 | Dudschus |
| 2006/0156645 | A1 | | 7/2006 | Munday et al. |
| 2007/0272485 | A1 | | 11/2007 | Baake |
| 2010/0108442 | A1 | | 5/2010 | Ballantyne |
| 2012/0097406 | A1 | | 4/2012 | Silcox et al. |
| 2012/0312633 | A1 | | 12/2012 | Massey |
| 2016/0194890 | A1 | | 7/2016 | Landry |
| 2017/0259090 | A1 | | 9/2017 | Gaines et al. |
| 2018/0272163 | A1 | | 9/2018 | Colorado |
| 2019/0262635 | A1 | | 8/2019 | Ballantyne |

FOREIGN PATENT DOCUMENTS

| | | |
|---|---|---|
| DE | 3719953 A1 | 12/1988 |
| DE | 29820510 U1 | 12/1999 |
| DE | 202009013795 U1 | 2/2011 |
| EP | 1205219 A2 | 5/2002 |
| GB | 2113285 A | 8/1983 |
| GB | 2160571 A | 12/1985 |
| GB | 2334292 A | 8/1999 |
| JP | H10146397 A | 6/1998 |
| JP | 2006102219 A | 4/2006 |
| WO | 9949154 A1 | 9/1999 |
| WO | 2006105837 A1 | 10/2006 |
| WO | 2013125945 A1 | 8/2013 |
| WO | 2013168839 A1 | 11/2013 |

OTHER PUBLICATIONS

PCT International Search Report and Written Opinion, PCT/US2009/062695, dated May 19, 2010, 6 pages.
PCT International Search Report and Written Opinion, PCT/US2020/033547, dated Sep. 8, 2020, 16 pages.
Safefall Supply, G-Clamp Temporary Fall Protection System Demo Video, Jun. 6, 2018, https://www.youtube.com/watch?v=qRtAju9VYMw.
PCT International Search Report and Written Opinion, PCT/US2021/032895, dated Sep. 3, 2021, 11 pages.

* cited by examiner

GRABBER TOOL AND SYSTEM

BACKGROUND

Conventional approaches for fastening objects to structural elements such as rafter beams and rafter tails frequently involve attaching the objects by screwing or nailing them into place. Other conventional approaches involve the use of clamps or hooks which hang from the top of suspended beams.

However, these conventional approaches have shortcomings. For instance, the use of screws or nails may cause aesthetic and/or structural damage. Conventional clamps may also cause damage and have limited surface area, which in turn limits the weight of objects which can be safely supported. Hooks hung over the top of beams have similar problems, and also require an accessible top surface, which is not available in many instances (for example, rafter beams in a building).

SUMMARY

An improved approach to hanging objects from rafter beams, for example, or other similarly shaped structures has the benefit of causing little or no aesthetic damage to structures and no structural damage. Objects are supported by a mounting surface which is coupled to one or more coupling devices which grasp the structure. Multiple coupling devices may be used along the length of a beam to allow larger and heavy objects to be supported using attachments that couple to each of the multiple coupling devices. Similarly, the coupling devices may be attached to more than one beam further enabling easy hanging of extended objects.

Exemplary improved anchoring devices and systems may include a coupling device having a generally U-shaped cradle and a lever device having a lever body and a lever arm which forms part of the cradle. The coupling device is configured to, upon an application of force to the lever device tending to rotate the lever arm upward, grasp a beam about three sides of that beam from beneath the beam (i.e., along the bottom surface and on two adjacent sides).

The anchoring device may further include a mounting surface coupled to an underside of the anchoring device, the mounting surface disposed beneath the coupling device and configured to support an attached structure.

In some embodiments, the coupling device, when grasping the beam, has at least two areas of contact with respective sides of that beam: (1) a first contact area having a substantially flat surface constructed from a compressible material and (2) a curved second contact area disposed on a side of the lever body opposite the first contact area. In such an embodiment, the application of force to the lever device tending to rotate the lever arm downward causes the second contact area to engage the surface on the respective side of the beam.

In some such embodiments, the application of force is provided at least in part by a spring configured and arranged to hold the lever arm in a position which causes the coupling device to remain in a closed state when no additional force is applied to the lever device in opposition to the force provided by the spring.

Additional embodiments include at least two sets of coupling devices, each set containing one or more coupling devices. In such embodiments, the coupling devices belonging to each set are configured and arranged to grasp a respective beam, each respective beam being distinct from each other respective beam and the mounting surface is coupled to each subset of coupling devices.

Methods relating to improved anchoring devices also are described herein. In a method embodiment, embodiments of anchoring devices disclosed herein are coupled to rafter beams of a building and used to support a mounting plate with a perpendicular extension in order to provide a temporary soffit or soffit-and-wall structure for use in conjunction with devices and related methods for providing safety rigging for roof workers.

BRIEF DESCRIPTION OF THE FIGURES

Advantages of embodiments of the present invention will be apparent from the following detailed description of the exemplary embodiments thereof, which description should be considered in conjunction with the accompanying drawings in which:

FIGS. 5A and 5B are alternate perspective views of the device shown in FIGS. 2A and 2B, showing features visible from a perspective below the device. FIG. 5B also depicts the device in use, fastened to a pair of beams similarly to FIG. 2B.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention," "embodiments" or "invention" do not require that all embodiments of the method, system or apparatus include the discussed feature, advantage or mode of operation.

Terms indicating relative position such as "above," "below," "upper," "lower," et al. are used for purposes of illustration only, unless otherwise noted and are made with reference to the orientation of the drawings. It should be understood that these terms are not generally meant to indicate a preferred orientation when such an orientation is not inherently or explicitly required.

This application makes reference to "rafters," "beams," "rafter beams," and "rafter tails." It should be understood that these terms are not meant to limit the invention to use with these specific objects, which are used as examples. It should also be understood that embodiments of the current invention are suitable for use with any other structure similar to those discussed herein (e.g., other structures with rectangular cross-sections).

Figure 1A:
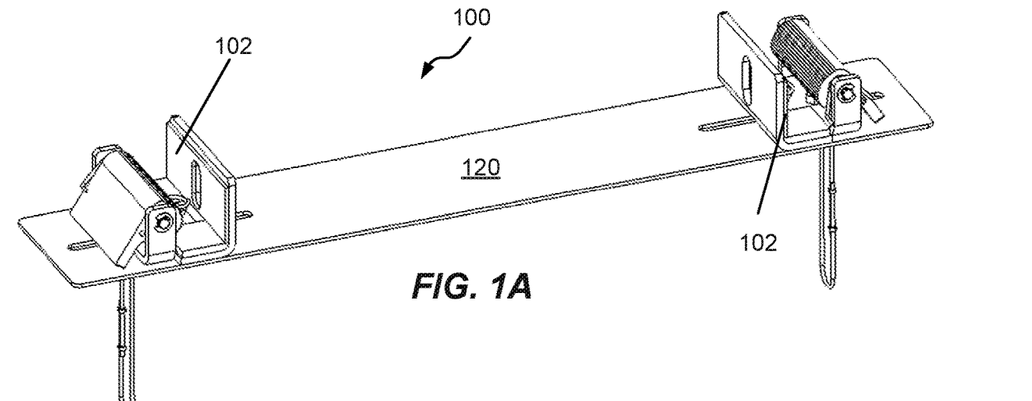
FIG. 1A is an exemplary perspective view of an improved device for non-destructively anchoring objects to rafter beams, rafter tails, and similar structures.

FIG. 1A shows an exemplary anchoring device 100. The device has two coupling devices 102 and a plate 120 coupled to the two coupling devices 102. In different embodiments, the plate 120 is configured to support different objects or structures.

Figure 1B:
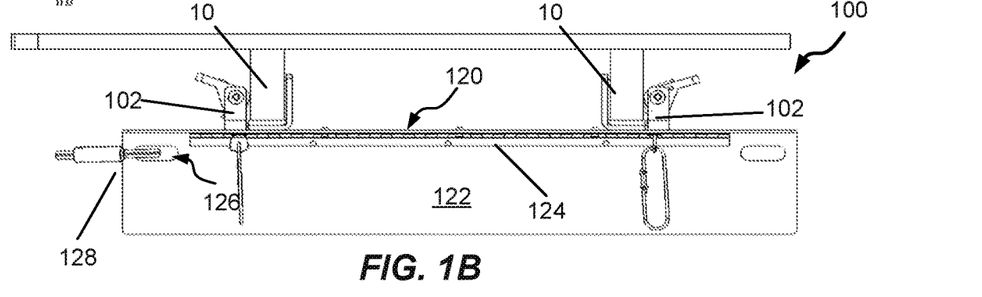
FIG. 1B is a cross-sectional view of a device related to the device of FIG. 1A in use, anchored to two rafter tails, and supporting a plate extending vertically below the device.
Figure 5A:
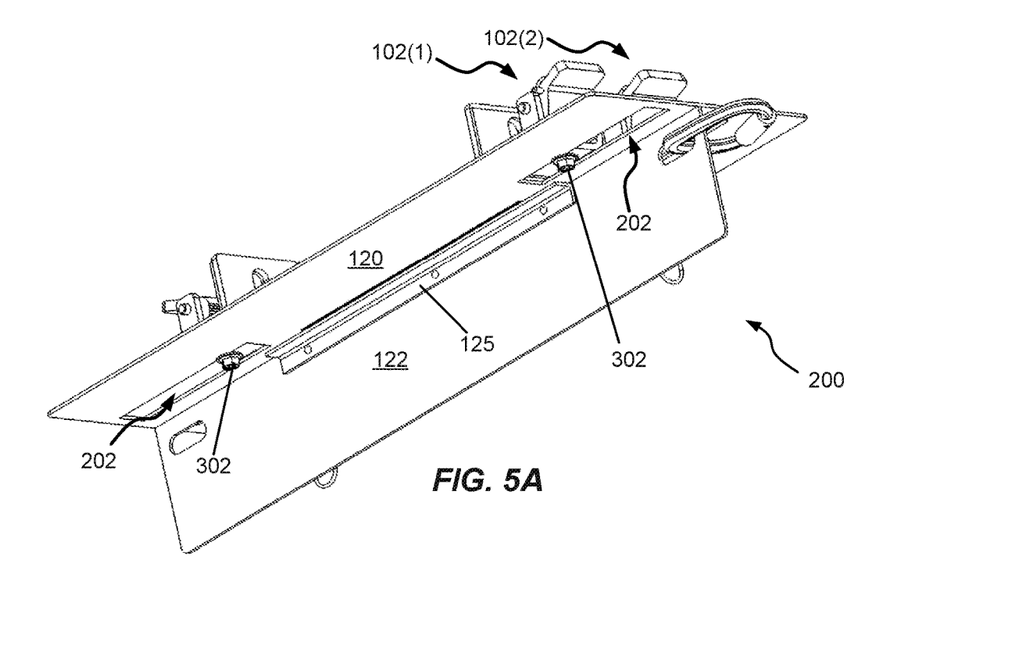

FIG. 1B shows a variant of anchoring device 100 in use, supporting a perpendicular extension 122 of the plate 120, as an example. The two coupling devices 102 each grasp a beam 10 (such as a rafter beam or a rafter tail on the exterior of a building). As shown, the perpendicular extension 122 is attached to the plate 120 with a hinge 124. This allows the perpendicular extension 122 to be stowed parallel to the plate 120 for ease of storage and transportation. Certain embodiments with hinged plate 120 include an angle iron 125 (i.e., a generally L-shaped bracket) as shown in FIG. 5A on the opposite side to the hinge 124 to hold the plate 120 in position once deployed. In some embodiments, the perpendicular extension 122 (or other attachment) includes a hole (or holes), such as example hole 126 shown in FIG. 1B, which aligns with a corresponding hole or holes), not shown, in the plate 120, allowing the perpendicular extension (or other attachment) to be fastened to the plate 120 while stowed using a clip (such as the example clip 128 shown in FIG. 1B), rope, or other similar coupling device. In other embodiments, the plate 120 and an attachment such as the perpendicular extension 122 may have a corresponding set of magnets which hold the attachment against the plate 120 when stowed.

Figure 1C:
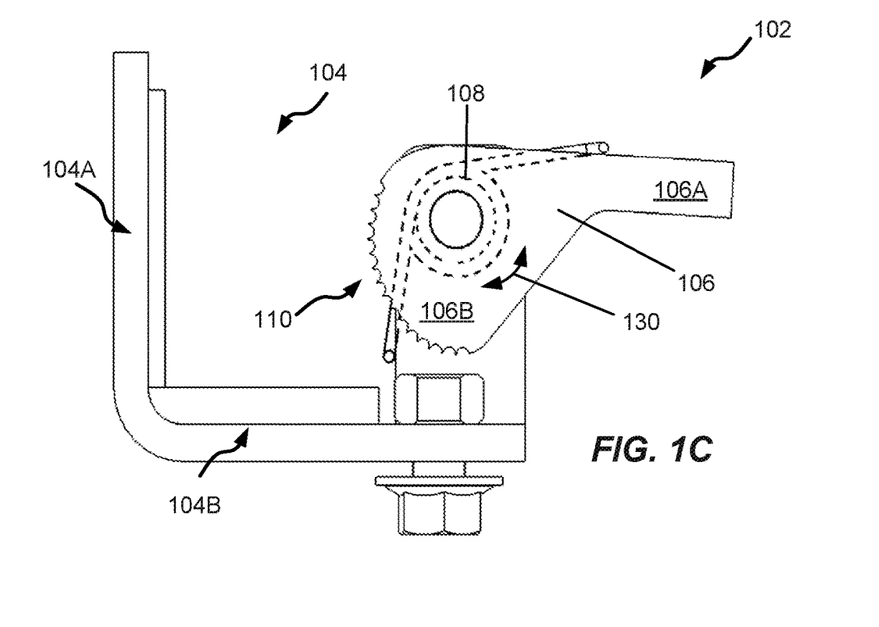
FIG. 1C is a cross-sectional view of an exemplary coupling device which forms part the device shown in FIGS. 1A and 1B.

FIG. 1C shows an exemplary coupling device 102 in greater detail. It should be understood that various embodiments may include a single coupling device 102, or many, as dictated by a particular application. The coupling device 102 includes a generally U-shaped cradle area 104 configured to engage with a structure (such as a beam 10 as shown in FIGS. 1A and 1B). It should be understood that the term "U-shaped" is meant to describe the shape of the cradle area 104 in general terms. For example, in some embodiments, the cradle area 104 may have sharp or square corners. In other embodiments, the corners may be rounded. Importantly, when grasping the beam 10, the cradle 104 makes contact with the beam 10 on two substantially parallel sides as well as a third side disposed between those two sides, as illustrated in the figures and described further below.

The cradle 104 also includes a lever device 106. The lever device 106 has a lever arm 106A and a lever body 106B. The cradle area as three surfaces, 104A, 104B, and 110. Surface 110 is provided by the lever body 106B, as shown. In some embodiments, such as the coupling device 102 pictured in FIG. 1C, the surface 110 is serrated in order to securely engage the surface 110 with the structure. Surfaces 104A, 104B, and 110 may consist of various materials depending upon the chosen application. In certain preferred embodiments the surfaces 104A and 104B are provided with a deformable coating such as rubber, or any other suitable material, to maximize the contact area between the cradle 104 and the beam 10, and provide a high coefficient of static friction at along the contact area to help support the coupling device 102 once anchored to the beam 10.

The lever device 106 is configured such that when the lever device 106 experiences a force tending to rotate the lever arm 106A downward, the coupling device 102 grasps the beam 10 about three sides from beneath the beam 10 (i.e., the bottom and two vertical sides). In preferred embodiments, the lever arm device 106 includes a spring 108 which biases the lever arm 106A in the downward ("closed") position. In such embodiments, to couple the anchoring device 100 to one or more beams, a user "opens" each cradle 104 by pushing the corresponding lever arm 106A against the spring 108 to open the cradle 104 and guides it into position surrounding the beam 10. This may be accomplished in more than one way: e.g., by directly pushing on the lever arm 106A, or by pushing the entire cradle area 104 against the beam 10 such that the beam 10 pushes against the lever body 106B, causing the lever arm 106A to rotate upward (i.e., in a direction away from the cradle surface 104B.) Once the cradle 104 is positioned and the user no longer applies any force to the coupling device 102, the spring 108 forces the lever arm 106A downward, engaging the surface 110 with the beam 10 and pushing surfaces 104A and 104B securely against the beam 10.

In certain embodiments, the cradle 104 may be configured such that, if the cradle 104 is not already opened, the cradle 104 will conveniently open itself as the user guides the cradle 104 into position surrounding the beam 10. In some embodiments, the force required to close the cradle 104 and engage the beam 10 is supplied either partially or entirely by a torque on the lever device 106 due to gravity. In some such embodiments, the spring 108 is not required, as represented by views in the figures where the spring 108 is absent. In other embodiments, the force required to engage the beam 10 is partially or entirely supplied by a user pushing on the lever arm 106A. In certain preferred embodiments, the coupling device 102 is configured such that a downward force applied to the coupling device 102 (which would tend to separate the coupling device 102 from the beam 10) results in increasing contact forces between the cradle 104 and the beam 10. This prevents the coupling device 102 from slipping off the beam 10 if the cradle 104 has not been intentionally opened.

Figure 2A:
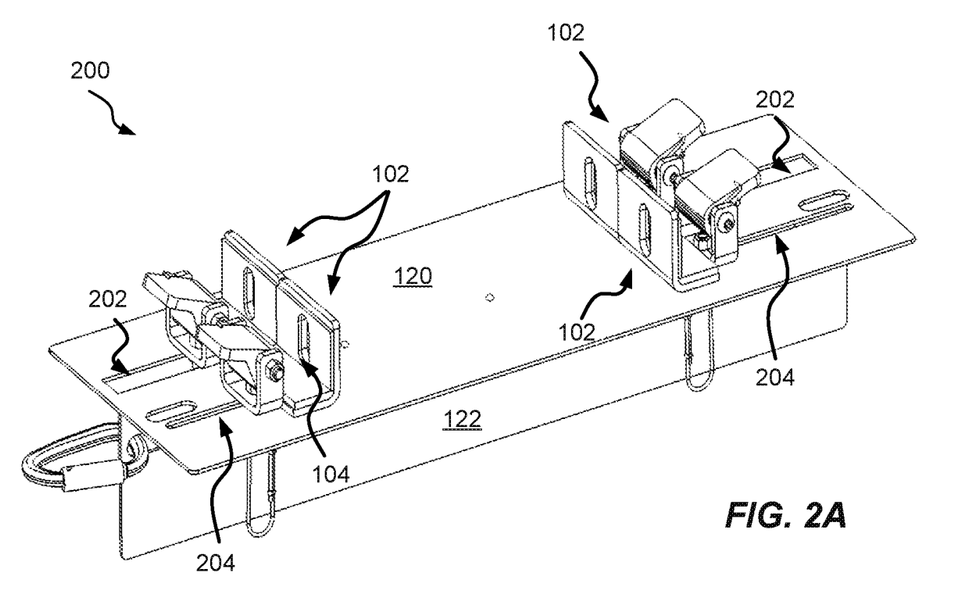
FIG. 2A is an exemplary perspective view of an alternate embodiment of the device depicted in FIGS. 1A and 1B, including four of the fastening components shown in FIG. 1C, as opposed to two.

FIG. 2A shows an alternate embodiment 200, particularly suited to supporting larger/heavier objects and/or spanning beams that are wider apart. The embodiment pictured includes two coupling devices 102 on each of two ends of the anchoring device 200, for a total of four coupling devices 102. Particular reasons for this arrangement will be explained below. The plate 120 of device 200 is shown having two slots on each end: a wider slot 202 and a narrower slot 204 (for convenience these slots will be referred to as a "wide" slot 202 a "narrow" slot 204). In some embodiments, one wide slot 202 and one narrow slot 204 may run the length of the plate 120. The slots allow the plate 120 to be attached to the coupling devices 102 after the coupling devices 102 have been securely coupled to beams 10. One of each of the slots 202 and 204 are shown in greater detail in FIG. 2B which also illustrates the anchoring device 200 in use, with the coupling devices 102 grasping a beam 10. The wide slot 202 allows a user to coarsely position the plate 120 under the coupling devices 102. Suitable mechanical features on the underside of the coupling devices 102 (which will be described in connection with FIG. 3A, below) allow a user to suspend the plate 120 temporarily until it can be secured to all the coupling devices 102.

Figure 2B:
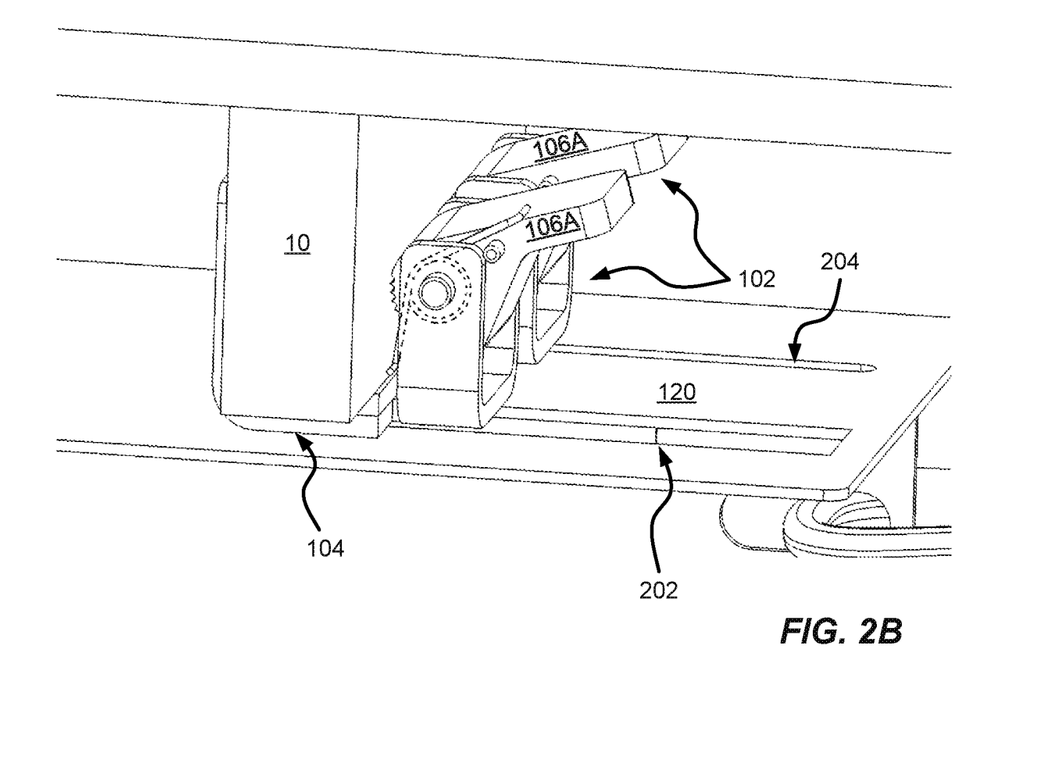
FIG. 2B is a perspective view depicting the device shown in FIG. 2A fastened to a pair of beams.
Figure 3A:
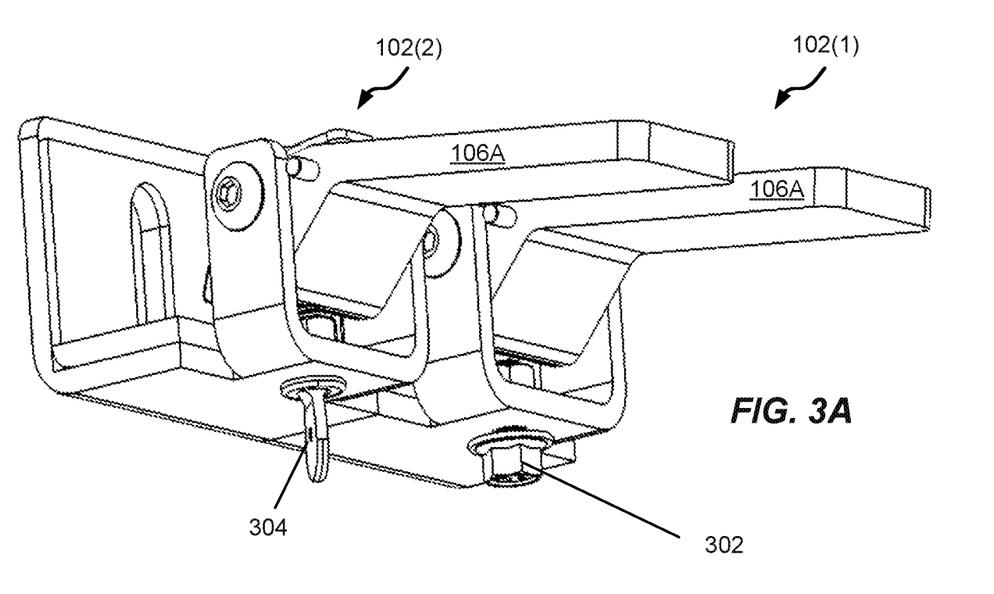
FIG. 3A is a perspective view showing a pair of coupling devices similar to those which form part of the device shown in FIGS. 2A and 2B and other similar embodiments.

FIG. 3A shows a pair of coupling devices 102 for use in embodiment 200, as shown in FIGS. 2A and 2B. One coupling device 102(1) is shown with a peg 302 configured to pass through the wide slot 202 shown in FIGS. 2A and 2B while the other coupling device 102(2) is shown with a thumbscrew 304 whose shaft is configured to pass through the narrow slot(s) 204 shown in FIGS. 2A and 2B. It should be understood that the peg 302 and thumbscrew 304 are example structures and may be replaced in some embodiments with other structures suitable for the purposes described herein. As an example, a suitably-positioned bolt with sufficient shaft and head dimensions may be used as the "peg" 302. The peg 302 is configured such that the peg 302 has a head significantly wider than the shaft but narrower than the wide slot(s) 202. This allows a user to position the mounting plate 120 under a set of coupling devices 102, passing the pegs belonging to the coupling devices 102(1) through the wide slot(s) 202. Because the head of each peg 302 is significantly wider than its shaft, the plate 120 can be translated such that the wide slots (or slot) 202 are off-center relative to the shafts of the pegs 302 allowing the mounting plate 120 to be partially suspended from the peg heads. The mounting plate 120 and slots are configured such that, when arranged as described above relative to the pegs 302, the narrow slots (or slot) 204 are aligned with the other coupling devices 102(2). At this point, the plate 120 may be solidly attached by passing one or more threaded fasteners (e.g., a bolt or the thumbscrew 304) through the narrow slots (or slot) 204 and threading the fastener (or fastener) into a threaded hole (or holes) in one (or more) of the coupling devices 102.

It should be appreciated that this particular arrangement of paired coupling devices 102 (one coupling device 102(1) and one coupling device 102(2)) and slots in a plate such as plate 120 confers certain advantages. In particular, positioning of the coupling devices 102 is made adjustable to accommodate sets of beams with various spacing. In certain embodiments, this arrangement enables an anchoring device such as device 200 to accommodate beams which are not parallel to each other by adjusting the angle between the coupling devices 102(1) and 102(2) of each pair coupling devices 102.

Figure 3B:
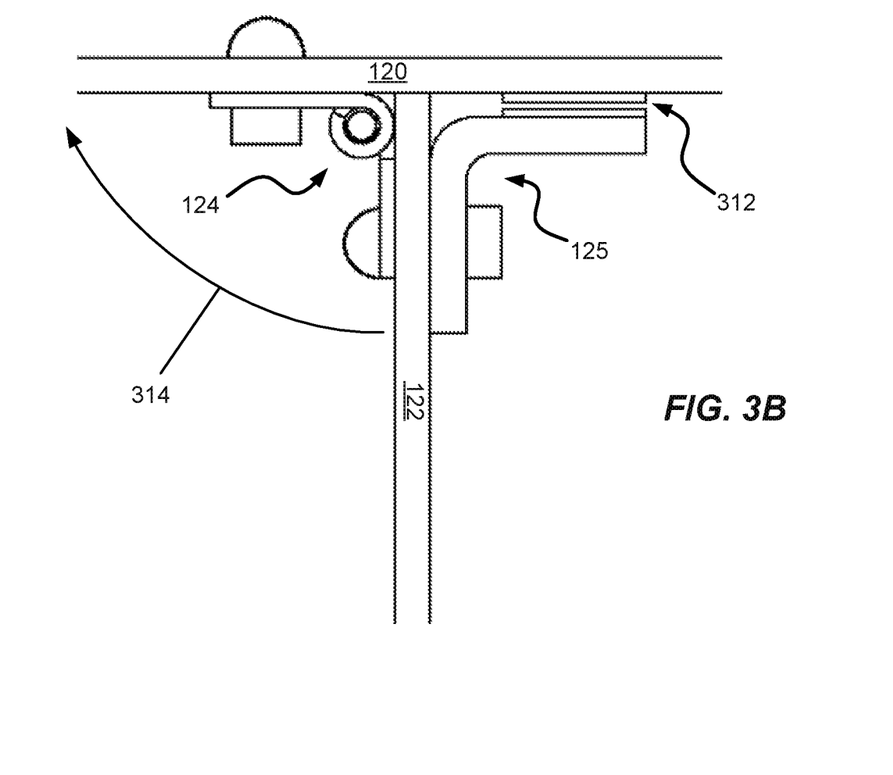
FIG. 3B is a cross-sectional view showing details of elements shown in FIGS. 1B, 2A, 5A and 5B in certain embodiments.

FIG. 3B shows a cross-section of features of certain embodiments having a perpendicular extension 122 similar to the embodiments pictured in FIGS. 1B, 2A, 5A and 5B. Shown in FIG. 3B is a cross-section of the intersection of the plate 120 with the perpendicular extension 122. On one side of the perpendicular extension 122, the hinge 124 is shown fastened to the plate 120 and to the perpendicular extension 122. On the other side of the perpendicular extension 122, the angle iron 125 is shown fastened to the perpendicular extension 122. In certain embodiments, as pictured in FIG. 3B, the angle iron 125 maintains the perpendicular extension 122 in a perpendicular arrangement relative to the plate 120 once the perpendicular extension 122 is deployed. In the example, each of a pair of magnets 306 is disposed on the angle iron 125 and the plate 120 as shown. The magnets 306 are configured such that they attract each other, thereby holding the perpendicular extension 122 perpendicular relative to the plate 120. In FIG. 3B the perpendicular extension 122 is deployed. The perpendicular extension 122 may be rotated into the stowed position by moving along a path illustrated by the curved arrow 314.

Figure 4A:
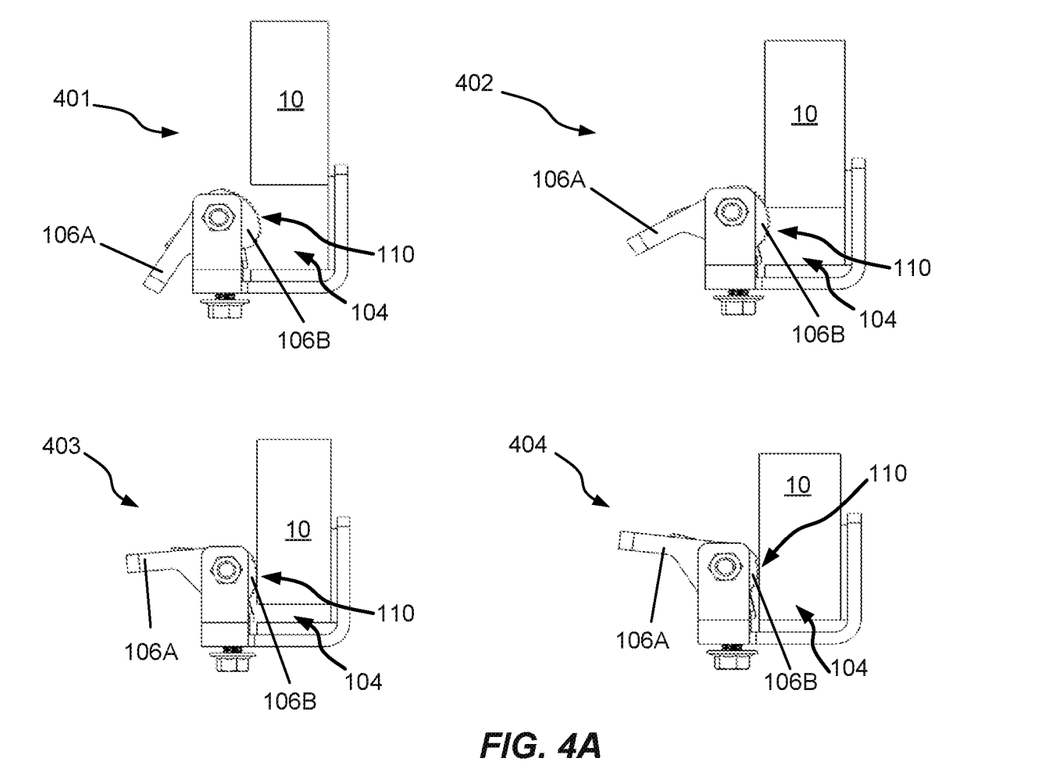
FIG. 4A illustrates a series of four configurations of a device similar to the coupling device shown in FIG. 1C during a process of receiving and grasping a beam.

FIG. 4A shows a coupling device 102 at four steps (401, 402, 403, and 404), during the process of grasping a beam 10. At step 401, the cradle 104 is in the "closed" position due to the spring 108 biasing the lever arm 106A downward. It will be appreciated that due to the arrangement of the lever device 106 (with the surface 110 of the lever body 106B forming part of the cradle 104) and the curvature of the surface 110, the narrowest part of cradle 104 is narrower than the beam 10 at the narrowest point. It will be understood that not all embodiments will have a spring 108. In such embodiments, the lever arm 106A may be biased downward by a torque due to gravity acting on the lever arm 106A.

At step 402, the beam 10 has begun to contact the surface 110 of the cradle 104, which belongs to the lever body 106B of the lever device 106. As the beam 10 is brought into contact with lever device 106, the lever device 106 experiences a force (via contact with the lever body 106B and/or a worker pushing the lever arm 106A upward, for example) which tends to rotate the lever arm 106A upward. In some embodiments, this process is aided by serrations on the contact surface 110. Due to the curvature of the lever body 106B, the cradle 104 begins to "open" (i.e., become wider) as the lever arm 106A rotates upward.

At step 403, the beam 10 pushes (or is pushed) further into the cradle 104, with the lever arm 106A continuing to rotate downward, further opening the cradle.

At step 404, the cradle 104 has been opened to fully receive the beam 10 which rests against the contact surface 110 and the other two contact surfaces of the cradle 104. The configuration shown at step 404 is similar to the arrangement expected if a worker were to push the coupling device 102 against the beam 10 and continue to hold the coupling device 102 in place against gravity and, in embodiments where the lever device 106 includes a spring 107, against the biasing force of the spring 108.

Figure 4B:
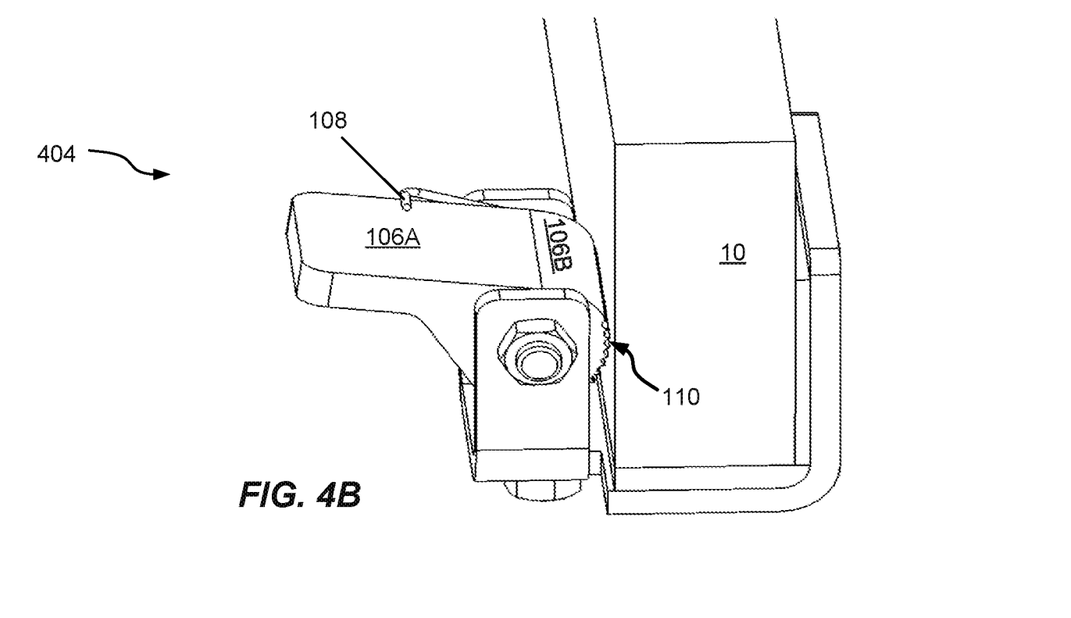
FIG. 4B is a perspective view of the device shown in FIG. 4A while grasping a beam.

FIG. 4B shows a perspective view of the coupling device 102 in the configuration of step 404. It will be appreciated that the lever arm 106A will tend to rotate downward if no counteracting force is applied. Due to the curvature of the contact surface 110 (and optionally aided in some embodiments by serrations on the contact surface 110), this downward rotation of the lever arm 106A will tended to tighten the grip of the coupling device 102 on the beam 10. It should be appreciated that these features of the coupling device 102 allow the coupling device 102 to "self-tighten" and that slippage of the coupling device 102 away from the beam 10 due to gravity or other forces tending to pull the coupling device 102 away from the beam 10 will tend to tighten the grip of the coupling device 102 on the beam 10.

Figure 4C:
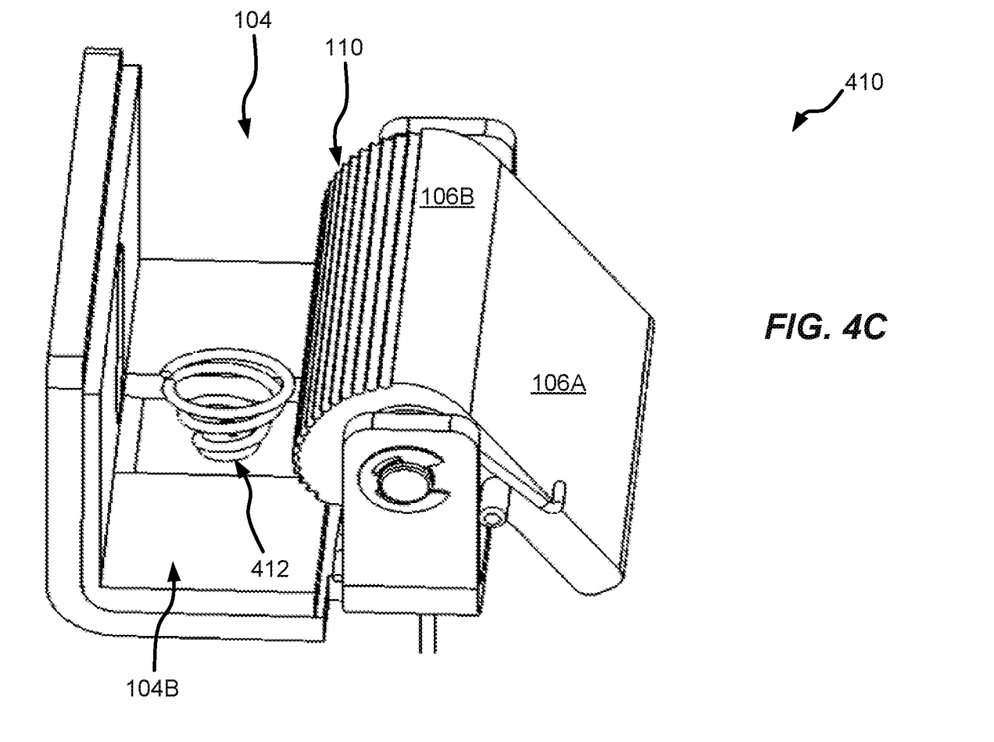
FIGS. 4C and 4D illustrate details of variants of the coupling device shown in FIG. 1C.
Figure 4D:
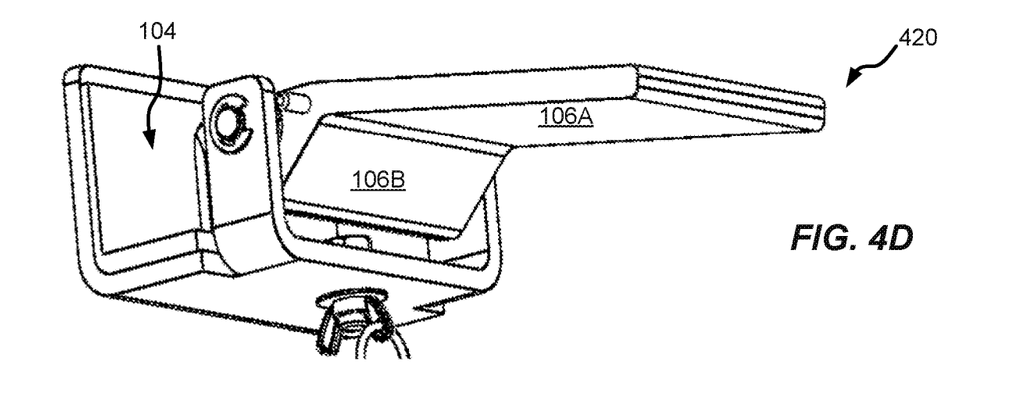

FIGS. 4C and 4D show variants of the coupling device 102 in certain embodiments. These variants are non-limiting examples of variations tailored for certain applications. FIG. 4C shows a variant 410 of the coupling device 102 which may be used in certain embodiments. In some applications the coupling device 102 may be fastened to a nearly-vertical beam 10, in which case, "slippage" of coupling device 102 as described above in connection to FIG. 4B would result in the coupling device 102 sliding downward rather than self-tightening. The coupling device variant 410 includes a spring 412 disposed in the middle of the bottom surface 104B of the cradle area 104. When the coupling device variant 410 is fastened to a beam 10, this spring 412 is placed in compression. The force of the spring 412 will provide a force on the beam 10 which in turn will create a force against the lever body 106B tending to rotate the lever arm 106A upward, allowing the coupling device variant 410 to self-tighten once closed, regardless of the orientation of the coupling device variant 410 with respect to gravity.

FIG. 4D shows a variant 420 of the coupling device 102. The coupling device variant 420 omits the spring 108, as shown in FIG. 1C and elsewhere. In variant 420, the lever arm 106A is elongated providing both a greater distance between the end of the lever arm 106A and the fulcrum near the lever body 106B, as well as added mass. These features are designed to provide a sufficient force biasing the lever arm 106A downward due to gravity, analogously to the function of the spring 108.

FIG. 5A shows one side of embodiment 200 in use together with the arrangement of coupling devices 102(1) and 102(2) discussed above. In particular, FIG. 5A shows the pegs 302 of the coupling devices 102(1) passing through two wide slots 202 to partially support the plate 120 and perpendicular extension 122 described previously. Also visible is the angle iron 125, described earlier in connection with FIG. 1B. For purposes of illustration only, the coupling devices 102 are depicted in FIGS. 5A and 5B with the lever arms 106A rotated upward rather than as described in connection to FIG. 4A above.

Figure 5B:
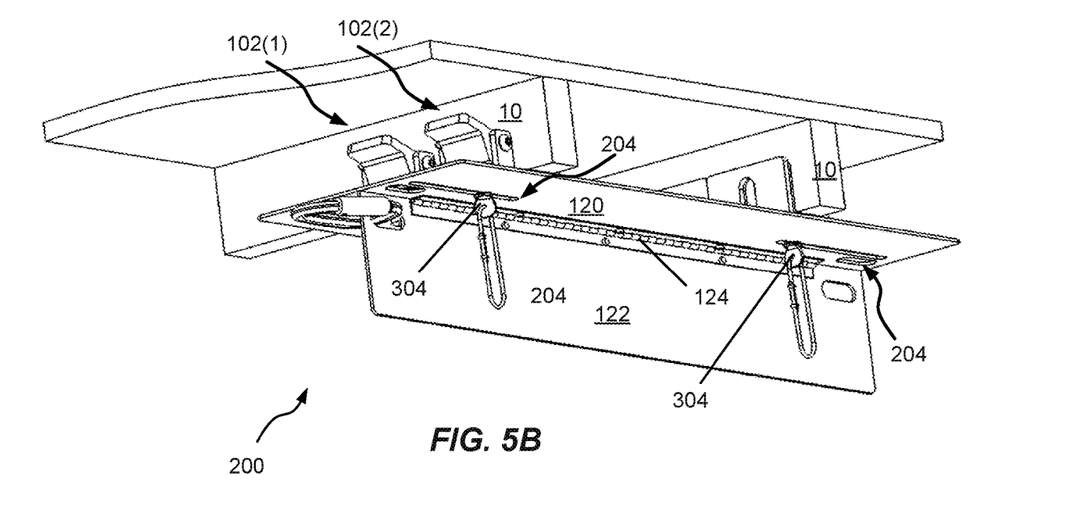

FIG. 5B shows the opposite side or front of embodiment 200 as that shown in FIG. 5A. FIG. 5B also shows embodiment 200 coupled to a pair of beams 10. Visible in FIG. 5B are the narrow slots 204, which are not visible in FIG. 5A Similarly, FIG. 5B shows the thumbscrews 304 and hinge 124, which are not visible in FIG. 5A.

Figure 6A:
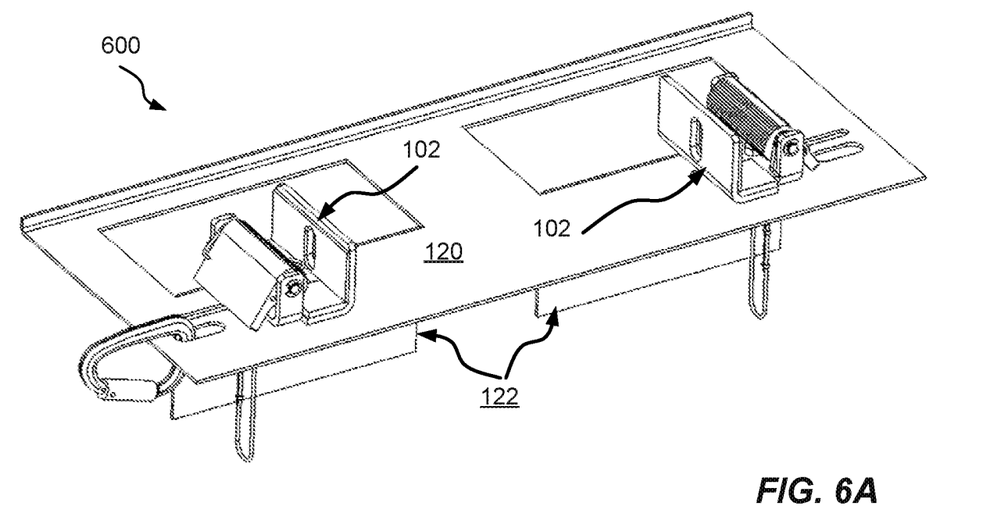
FIG. 6A is a top perspective view of an alternate embodiment related to the device shown in FIGS. 2A, 2B, 5A, and 5B.
Figure 6B:
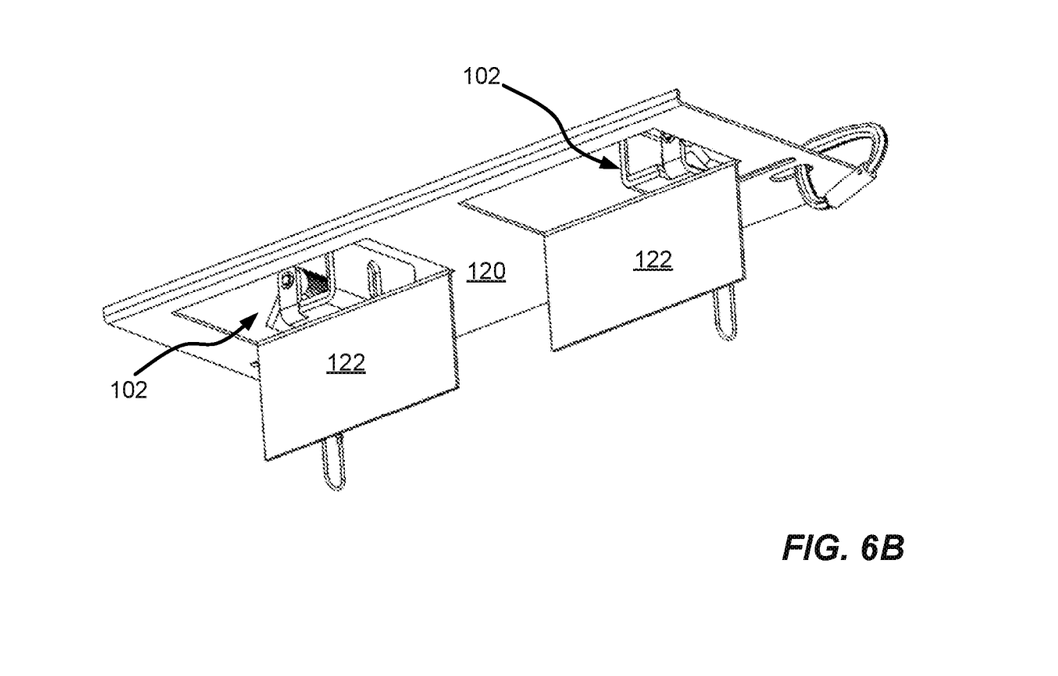
FIG. 6B is a bottom perspective view of the embodiment of FIG. 6A

FIGS. 6A and 6B are top and bottom views an alternate embodiment 500. The device of embodiment 500 features two enlarged coupling devices 102, rather than the four devices shown as part of embodiment 200. Additionally, the perpendicular extension 122 is divided into two segments and integrated into the mounting surface 120 as shown, realizing weight savings and lower manufacturing costs.

Application as a Temporary Soffit or Combined Soffit and Wall

Figure 7A:
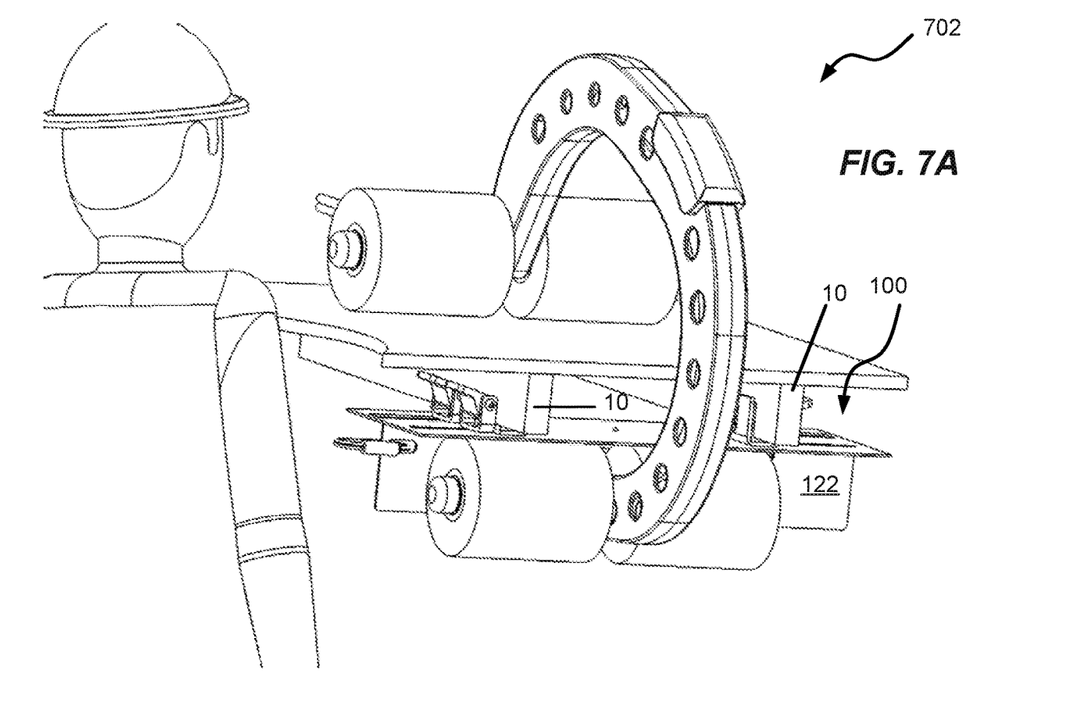
FIG. 7A is a perspective view of the device of FIGS. 2A and 2B attached to two rafter beams of a house and being used to help secure an "eave hook" device (the Eveook™) sold by the Applicant as part of a system for temporary safety rigging for roof workers.

FIG. 7A depicts an example application of certain embodiments disclosed herein. In the pictured application, an embodiment such as example embodiment 200 is used in conjunction with an "eave hook" device 502 previously patented by the Applicant (U.S. Pat. No. 8,292,030) and marketed as the Eveook™. The Eveook™ is a device which allows roof workers to quickly install safety lines when working on roofs. As disclosed in U.S. Pat. No. 8,292,030, a pair of Eveooks™ are used to anchor a safety line by pressing against the both the roof and soffits of a building. However, to function properly, the Eveook™ system requires the presence of a soffit or similar structure, which not all buildings have.

Embodiments of the present invention, such as those shown in FIGS. 1B, 2A-B, and 5A-B may be used to provide a temporary soffit structure, as shown in FIG. 7A, using the following example procedure. The side of the device 200 facing the wall off the structure is similar to that shown in FIG. 5A. The side of the device 200 facing away from the wall, which will be coupled to the Eveook™ is similar to that shown in FIG. 5B. First, a worker attaches a coupling device 102, such as the one shown in FIG. 1C, or a pair of coupling devices 102, such as the pair shown in FIG. 3A, to a rafter beam 10 on the exterior of a building. Next, the worker attaches a second coupling device 102 (or pair of coupling devices 102), to an adjacent rafter beam 10. The worker then attaches a mounting plate 120 to the coupling devices. The plate 120 may have a perpendicular extension 122 already connected to it, or the worker may attach the perpendicular extension 122. In some embodiments, the perpendicular extension 122 is connected to the mounting surface 120 with a hinge 124, allowing the perpendicular extension 122 to be closed or folded alongside of the mounting plate, to be stowed for easy carrying. In this case, the worker can easily carry the closed plate 120 to the top of a ladder and then deploy the vertical attachment 122 for installation of the mounting plate 120.

Figure 7B:
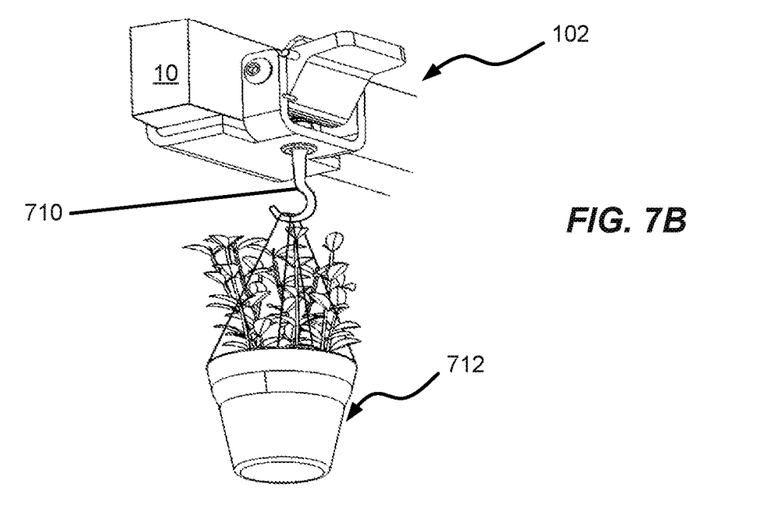
FIG. 7B is a perspective view of an alternate embodiment used as a hanger for a potted plant.

In certain other applications, only a single coupling device 102 may be required. FIG. 7B shows one such application where a single coupling device 102 supports a hook 710 which in turn is used to hang a houseplant 712, as an example.

It should be understood that the embodiments herein may be fabricated in any size and with any arrangement of coupling devices as required for a particular application. As an example, embodiments configured to couple to three or more beams may be fabricated. Additional embodiments may be designed to accommodate beams which are not parallel to each other.

It should be evident that the improved anchoring devices, such as example embodiments 100 and 200, and any components disclosed herein may be fabricated or formed in a variety of ways and from a variety of materials. The various parts may be machined, molded or otherwise fabricated from high strength materials such as steel, aluminum alloy, reinforced aluminum, tubular alloy, high-strength plastics or wood, or be manufactured from a combination of any suitable materials and processes. The choice of materials and construction are clearly within the scope of the appended claims.

The foregoing description and accompanying drawings illustrate principles, preferred embodiments and modes of operation of the invention. However, the invention should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the invention as defined by the following claims.

We claim:

1. A nondestructive anchoring device for nondestructively anchoring objects to one or more wooden or other beams, the device comprising:
    a coupling device having a generally U-shaped cradle and a lever device having a lever arm and a lever body, the lever device forming a part of the cradle, the coupling device configured to, upon an application of force to the lever device tending to rotate the lever arm upward, grasp a respective beam about three sides of that beam from beneath the beam, the three sides including a bottom side of the beam and two mutually parallel sides of the beam perpendicular to the bottom side of the beam;

a mounting surface coupled to an underside of the anchoring device, the mounting surface disposed beneath the coupling device and configured to support an attached structure; and at least one spring chosen from:
  a first spring within the cradle, wherein, when the coupling device grasps the respective beam, the spring is disposed in a recess of a base contact area and compressed, the spring configured to provide a force against the respective beam which tends to separate the cradle from the respective beam, thereby increasing the set of contact forces between the cradle and the respective beam; and
  wherein the application of force to the lever device tending to rotate the lever arm downward is provided at least in part by a second spring configured and arranged to hold the lever arm in a position which causes the coupling device to remain in a closed state when no additional force is applied to the lever arm in opposition to the force provided by the spring;

wherein the mounting surface is supplied with a first slot and a second slot;

wherein the anchoring device includes at least two sets of coupling devices, each set containing one or more coupling devices;

wherein each set of one or more coupling devices includes a first coupling device and a second coupling device;

wherein the first coupling device of each set includes a peg coupled to the bottom of the first coupling device, the peg having a shaft and a cap wider than the shaft, the shaft coupling the underside of the first coupling device to the cap, the cap configured and arranged to pass through the first slot;

wherein the second coupling device of each set includes a threaded hole configured and arranged to accept a threaded fastener;

wherein, when each peg belonging to the first coupling device of each set is passed through the first slot and the slot is translated in a direction mutually perpendicular to a long axis of the slot and to an axis of each peg:
  (a) the pegs are configured and arranged to at least partially support the mounting surface;
  (b) each threaded hole is configured and arranged to align with the second slot; and
  (c) the mounting surface is configured and arranged to be securely coupled to each of the subsets of coupling devices and is supported by both the pegs and a set of one or more threaded fasteners passing through the second slot and threadedly-fastened into at least one hole in a second coupling device belonging to one subset of the coupling devices.

2. The anchoring device of claim 1 wherein the coupling device, when grasping the respective beam, has at least two areas of contact with respective sides of that beam:
  (1) a first contact area having a substantially flat surface constructed from a compressible material and
  (2) a curved second contact area disposed on a side of the lever body opposite the first contact area;
  wherein, when the anchoring device is grasping the respective beam, an application of force to the lever device tending to rotate the lever arm downward causes the second contact area to engage the surface on the respective side of the beam.

3. The anchoring device of claim 2 wherein the coupling device is further configured, when grasping the respective beam and experiencing a force tending to separate the coupling device from the respective beam, to increase a set of contact forces between the cradle and the respective beam, the set of contact forces acting to maintain the coupling device in position grasping the respective beam.

4. The anchoring device of claim 2 wherein the application of force to the lever device tending to rotate the lever arm downward is provided at least in part by a torque caused by a downward force of gravity acting upon the lever arm, the downward torque being sufficient to cause the coupling device to remain in a closed state in the absence of at least one additional force applied to the lever device.

5. The anchoring device of claim 3 wherein the second contact area is provided with a series of serrations.

6. A nondestructive anchoring device for nondestructively anchoring objects to one or more wooden or other beams, the device comprising:
  a coupling device having a generally U-shaped cradle and a lever device having a lever arm and a lever body, the lever device forming a part of the cradle, the coupling device configured to, upon an application of force to the lever device tending to rotate the lever arm upward, grasp a respective beam about three sides of that beam from beneath the beam, the three sides including a bottom side of the beam and two mutually parallel sides of the beam perpendicular to the bottom side of the beam;
  a mounting surface coupled to an underside of the anchoring device, the mounting surface disposed beneath the coupling device and configured to support an attached structure; and
  at least one spring chosen from:
    a first spring within the cradle, wherein, when the coupling device grasps the respective beam, the spring is disposed in a recess of a base contact area and compressed, the spring configured to provide a force against the respective beam which tends to separate the cradle from the respective beam, thereby increasing the set of contact forces between the cradle and the respective beam; and
    wherein the application of force to the lever device tending to rotate the lever arm downward is provided at least in part by a second spring configured and arranged to hold the lever arm in a position which causes the coupling device to remain in a closed state when no additional force is applied to the lever arm in opposition to the force provided by the spring;
  wherein the anchoring device includes at least two sets of coupling devices, each set containing one or more coupling devices:
    wherein the coupling devices belonging to each set are configured and arranged to grasp a respective beam, each respective beam being distinct from each other respective beam; and
    wherein the mounting surface is coupled to each subset of coupling devices;
  wherein the attached structure is a perpendicular extension plate coupled to an underside of the mounting surface and configured to be oriented perpendicularly to the mounting surface;
  wherein the perpendicular extension plate is coupled to the underside of the mounting surface with a hinge on a first side of the perpendicular extension plate, the hinge allowing the perpendicular extension plate to be rotated into a parallel position relative to the mounting surface; and wherein the mounting surface and the perpendicular extension plate are jointly supplied with a closure mechanism, allowing the perpendicular extension plate to be stowed in the parallel position relative to the mounting surface.

7. The anchoring device of claim 6 wherein the closure mechanism includes a pair of corresponding holes disposed near respective edges of the mounting surface, and wherein the perpendicular extension plate may be stowed in the parallel position to the mounting surface by securing the perpendicular extension plate to the mounting surface passing a fastener through both holes belonging to the pair of corresponding holes.

8. The anchoring device of claim 6 wherein the closure mechanism is formed by magnets configured and arranged to hold the perpendicular extension plate and the mounting surface together when the perpendicular extension plate is placed in the parallel position.

9. A nondestructive anchoring device for nondestructively anchoring objects to one or more wooden or other beams, the device comprising:
   a coupling device having a generally U-shaped cradle and a lever device having a lever arm and a lever body, the lever device forming a part of the cradle, the coupling device configured to, upon an application of force to the lever device tending to rotate the lever arm upward, grasp a respective beam about three sides of that beam from beneath the beam, the three sides including a bottom side of the beam and two mutually parallel sides of the beam perpendicular to the bottom side of the beam;
   a mounting surface coupled to an underside of the anchoring device, the mounting surface disposed beneath the coupling device and configured to support an attached structure; and
   a perpendicular extension plate that includes an angle iron on a second side of the perpendicular extension plate opposite the first side of the perpendicular extension plate, the angle iron coupled to the perpendicular extension plate, the angle iron configured to maintain the perpendicular extension plate in a position substantially perpendicular to the mounting surface when the perpendicular extension plate experiences a force on the first side of the perpendicular extension plate in a direction oriented toward the second side of the perpendicular extension plate.

10. The anchoring device of claim 9 wherein the angle iron and the mounting surface are provided with a corresponding pair of magnets, the pair of magnets configured to supply an attractive force coupling the angle iron to the mounting plate when the perpendicular extension plate is oriented perpendicularly to the mounting surface.

11. A nondestructive anchoring device for nondestructively anchoring objects to one or more wooden or other beams, the device comprising:
   a coupling device having a generally U-shaped cradle and a lever device having a lever arm and a lever body, the lever device forming a part of the cradle, the coupling device configured to, upon an application of force to the lever device tending to rotate the lever arm upward, grasp a respective beam about three sides of that beam from beneath the beam, the three sides including a bottom side of the beam and two mutually parallel sides of the beam perpendicular to the bottom side of the beam; and
   a mounting surface coupled to an underside of the anchoring device, the mounting surface disposed beneath the coupling device and configured to support an attached structure;
   wherein the coupling device, when grasping the respective beam, has at least two areas of contact with respective sides of that beam:
   (1) a first contact area having a substantially flat surface constructed from a compressible material and
   (2) a curved second contact area disposed on a side of the lever body opposite the first contact area;
   wherein, when the anchoring device is grasping the respective beam, an application of force to the lever device tending to rotate the lever arm downward causes the second contact area to engage the surface on the respective side of the beam;
   wherein the application of force to the lever device tending to rotate the lever arm downward is provided at least in part by a spring configured and arranged to hold the lever arm in a position which causes the coupling device to remain in a closed state when no additional force is applied to the lever arm in opposition to the force provided by the spring; and
   wherein the mounting surface includes a hook configured and arranged to support an object by means of a tether.

12. The anchoring device of claim 2 wherein the second contact area is provided with a series of serrations.

13. The anchoring device of claim 2
   wherein the coupling devices belonging to each set are configured and arranged to grasp a respective beam, each respective beam being distinct from each other respective beam; and
   wherein the mounting surface is coupled to each subset of coupling devices.

14. The anchoring device of claim 2 wherein the mounting surface includes a hook configured and arranged to support an object by means of a tether.

15. A coupling device configured to anchor objects to a structure, the coupling device comprising:
   a generally U-shaped cradle defined by a base wall, a side wall extending from the base wall, and a cam positioned opposite to the side wall and rotatable between an opened position and a closed position, wherein a surface of the cam is closer to the side wall when the cam is in the closed position than when the cam is in the opened position; and
   a biasing element configured to provide a force to urge the cam toward the closed position at which the cam establishes a contact force with the structure that is opposed by the side wall of the U-shaped cradle to inhibit removal of the structure from an opening defined by the U-shaped cradle opposite the base wall;
   wherein the biasing element comprises a base resilient member positioned near the base wall of the U-shaped cradle and configured to apply a base force to the structure positioned within the U-shaped cradle in a direction toward the opening of the U-shaped cradle to provide the force to urge the cam toward the closed position; and
   wherein the base resilient member is in the form of a spring positioned adjacent the base wall of the U-shaped cradle to establish a linear force tending to urge the structure toward the opening defined by the U-shaped cradle.

16. The coupling device of claim 15, wherein the biasing element further comprises at least one additional biasing member chosen from:
- a release arm member extending radially away from the cam such that the mass of the release arm is configured to provide the force to urge the cam toward the closed position; and
- a cam resilient member positioned near the cam of the U-shaped cradle and configured to apply a cam force to the cam to urge the cam to rotate about a cam axis to provide the force to urge the cam toward the closed position.

17. The coupling device of claim 16, wherein the at least one additional biasing member is
- the cam resilient member in the form of a spring positioned adjacent the cam to establish a torsional force tending to rotate the cam about the cam axis toward the closed position.

* * * * *